US006501763B1

(12) United States Patent
Bhagavath et al.

(10) Patent No.: US 6,501,763 B1
(45) Date of Patent: Dec. 31, 2002

(54) NETWORK-BASED SERVICE FOR ORIGINATOR-INITIATED AUTOMATIC REPAIR OF IP MULTICAST SESSIONS

(75) Inventors: Vijay K. Bhagavath, Lincroft, NJ (US); Joseph Thomas O'Neil, Staten Island, NY (US); David Hilton Shur, Aberdeen; Aleksandr Zelezniak, Matawan, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/306,089

(22) Filed: May 6, 1999

Related U.S. Application Data

(63) Continuation of application No. 09/271,116, filed on Mar. 17, 1999.

(51) Int. Cl.[7] .................................................. H04L 3/24

(52) U.S. Cl. ........................ 370/432; 370/401; 370/410; 714/16; 714/748

(58) Field of Search ................................. 370/235, 218, 370/236, 237, 351, 389, 390, 432, 401, 410; 709/201, 202, 203, 223, 224, 225, 232, 235, 234; 714/746, 747, 748, 750, 15, 16, 18

(56) References Cited

U.S. PATENT DOCUMENTS

| 6,112,323 A | * | 8/2000 | Meizlik et al. ............. 714/748 |
| 6,148,005 A | * | 11/2000 | Paul et al. ................... 370/230 |
| 6,185,698 B1 | * | 2/2001 | Wesley et al. ................ 714/18 |
| 6,215,766 B1 | * | 4/2001 | Ammar et al. .............. 370/229 |
| 6,247,059 B1 | * | 6/2001 | Johnson et al. ............. 370/390 |
| 6,278,716 B1 | * | 8/2001 | Rubenstein et al. ........ 370/394 |

OTHER PUBLICATIONS

N.F. Maxemchuk et al., "A Cooperative Packet Recovery Protocol for Multicast Video," Int'l Conf. on Network Protocols, Oct. 29–31, 1997, Atlanta, Ga, pp. 1–8.
S. Pejhan et al., "Error Control Using Retransmission Schemes in Multicast Transport Protocols for Real–Time Media," IEEE/ACM Transactions on Networking, vol. 4, No. 3, Jun. 1996; pp. 413–427.
Diot et al., "Multipoint Communication: A Survey of Protocols, Functions, and Mechanisms," IEEE Journal on Selected Areas in Communications, vol. 15, No. 3, Apr. 1997; pp. 277–290.
Holbrook et al., "Log–Based Receiver–Reliable Multicast for Distributed Interactive Simulation," SIGCOMM '95, Cambridge, MA, pp. 328–341.
Delgrossi et al., "HeiTP—A Transport Protocol for ST–II", 1992 IEEE, 0–7803–0608–2/92; pp. 1369–1373.

* cited by examiner

Primary Examiner—Ricky Ngo

(57) ABSTRACT

A system and method are disclosed for the automatic and transparent repair of IP multicast sessions. The invention is a system and method for the repair of IP multicast sessions. In one aspect of the invention the method repairs a multicast session in a network, beginning with the step of sending a request message from a source to a subscription server in the network, requesting a repair service for an original multicast session originated by the source. The method continues by sending an enabling signal from the subscription server to a plurality of retransmit servers in the network, to buffer data traffic from the original multicast session, in response to the request. The method continues by buffering a copy of the data traffic at each of the plurality of retransmit servers and monitoring errors in each copy. The method continues by automatically selecting with the plurality of retransmit servers at least one retransmit server from among the plurality, having a minimum of the errors in its respective copy. The method concludes by sending the respective copy to a repair server in the network to enable the repair server to provide a repaired multicast session derived from the respective copy.

7 Claims, 20 Drawing Sheets

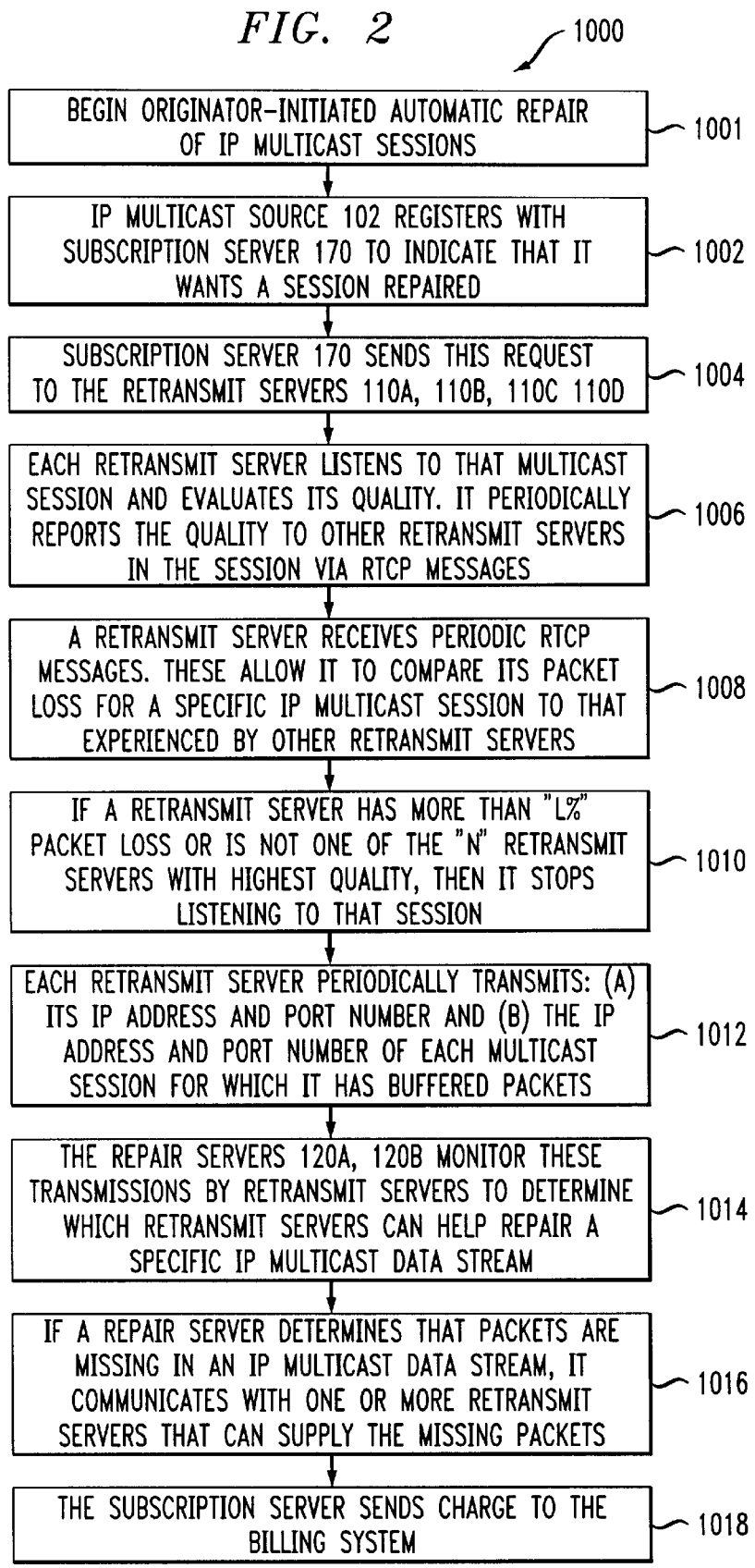

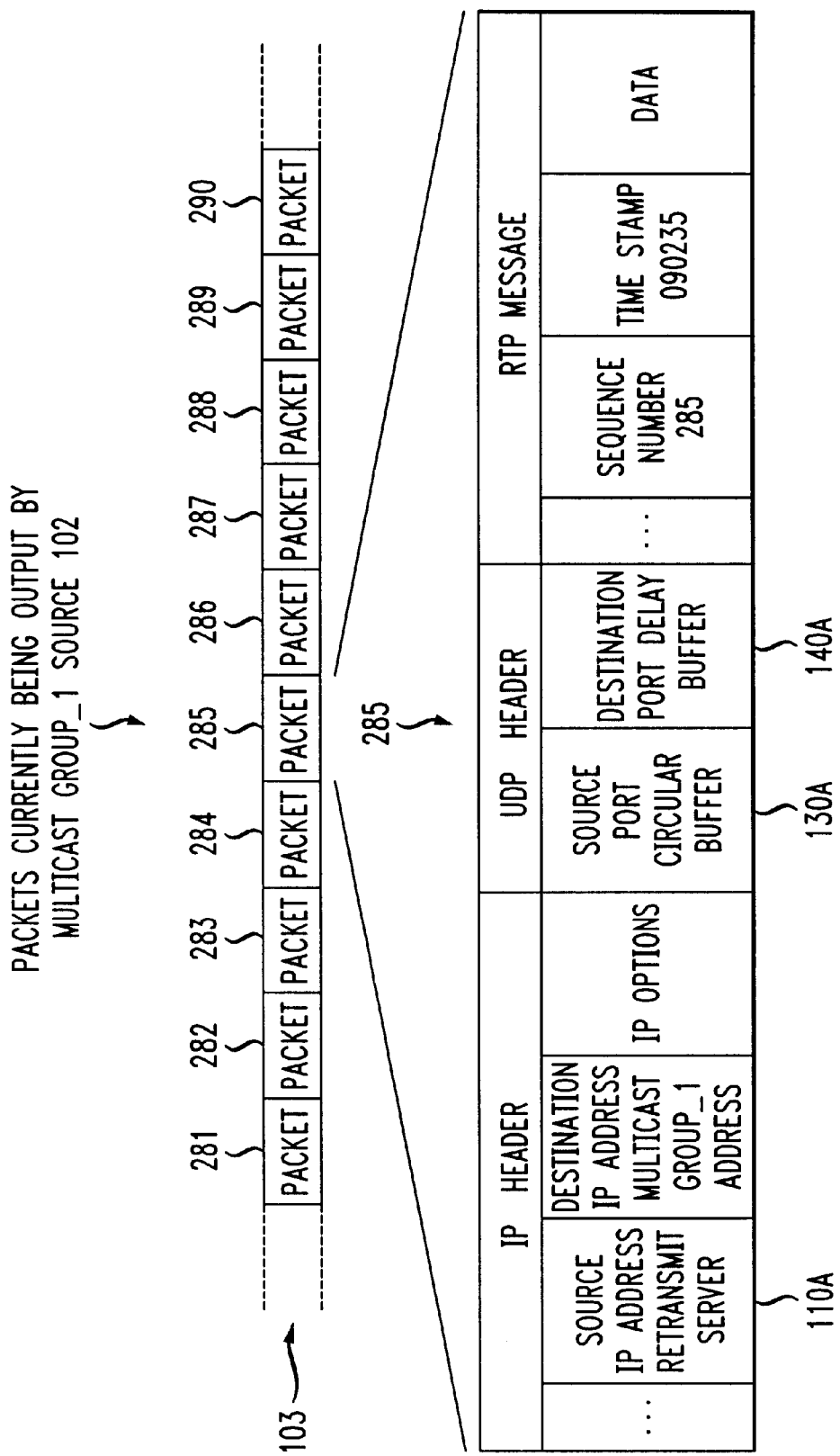

RTCP SOURCE DESCRIPTION PACKET PERIODICALLY OUTPUT BY MULTICAST GROUP_1 SOURCE 102

FIG. 2E

RTCP SENDER REPORT PACKET PERIODICALLY OUTPUT BY MULTICAST GROUP_1 SOURCE 102

| PACKET | | | | | | | |
|---|---|---|---|---|---|---|---|
| IP HEADER | | | UDP HEADER | | RTCP SENDER REPORT | | |
| ... SOURCE IP ADDRESS RETRANSMIT SERVER | DESTINATION IP ADDRESS MULTICAST GROUP_1 ADDRESS | IP OPTIONS | SOURCE PORT MESSAGE PROCESSOR | DESTINATION PORT MESSAGE PROCESSOR | SENDER'S ID GROUP_1 SOURCE | SENDER'S PACKET COUNT 290 | SENDER'S OCTET COUNT 290,000 |
| 110A | | | 132A | 142 | 102 | | |

103″

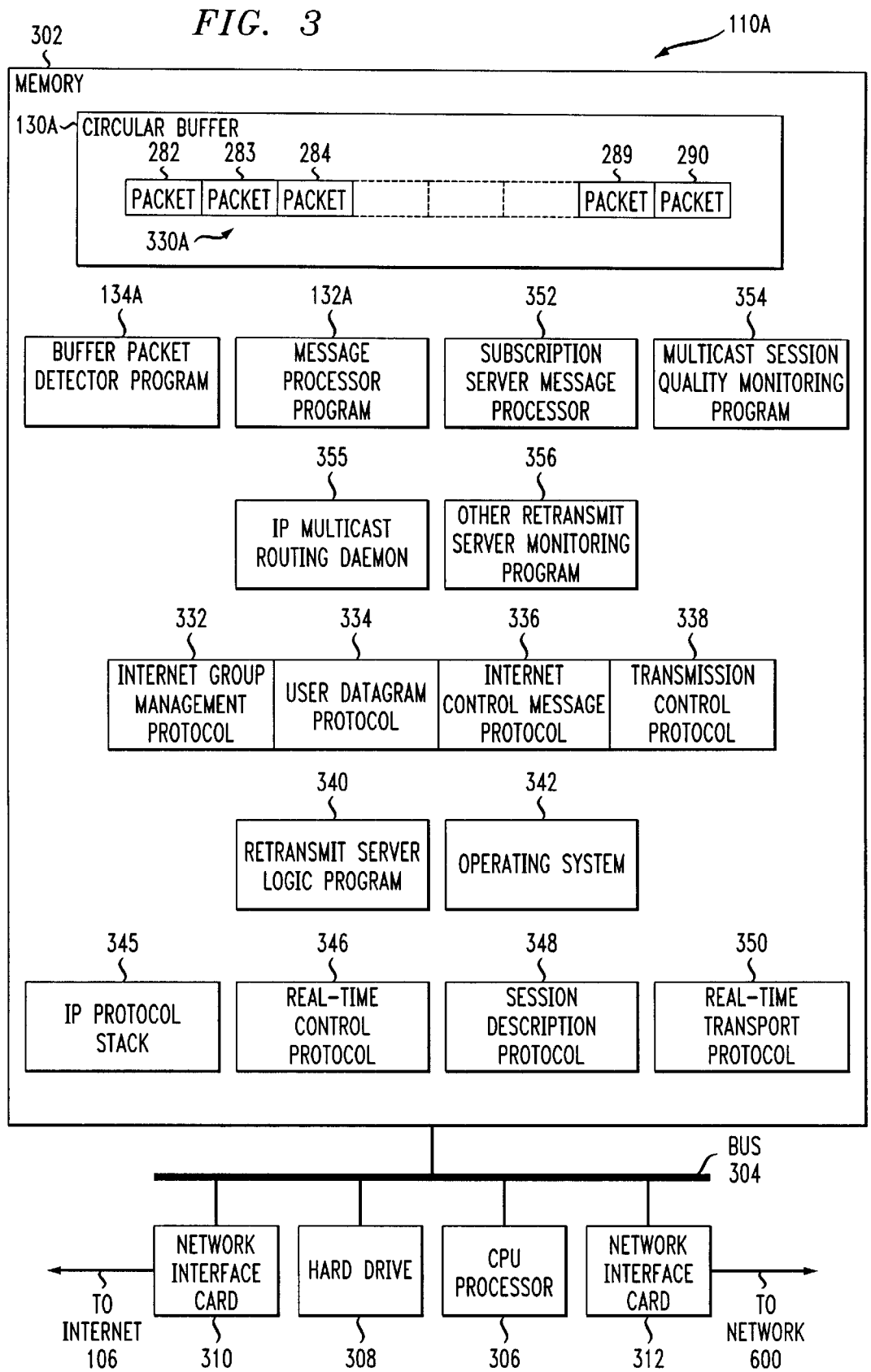

RTCP RECEIVER REPORT PACKET PERIODICALLY OUTPUT BY RETRANSMIT SERVER 110B

RTCP RECEIVER REPORT PACKET PERIODICALLY OUTPUT BY RETRANSMIT SERVER 110C

NETWORK-BASED SERVICE FOR ORIGINATOR-INITIATED AUTOMATIC REPAIR OF IP MULTICAST SESSIONS

RELATED PATENT APPLICATIONS

This patent application is a continuation of the copending U.S. patent application Ser. No. 09/271,116, filed Mar. 17, 1999, entitled "A Network-Based Service for the Repair of IP Multicast Sessions", by Nicholas Maxemchuk, David McManamon, David Shur, and Aleksandr Zelezniak, assigned to AT&T Corp. and incorporated herein by reference.

BACKGROUND OF THE INVENTION

IP multicasting provides an efficient way for a source to send a stream of User Datagram Protocol (UDP) packets to a set of recipients. The source sends only one copy of each packet to an IP network, such as the Internet, for example. The routers in the IP network do the work required to deliver that packet to each recipient. Various IP multicast routing protocols can be used in an IP network. These allow the routers to communicate with each other so that the multicast datagrams are sent only to those subnetworks with receivers that have joined a multicast session.

A multicast session is identified by an IP address and port number. The IP address is a Class D address in the range from 224.0.0.1 to 239.255.255.255. IP multicasting is more efficient than unicasting for group communication. Unicasting requires that the source send a separate copy of each datagram to each recipient. This requires extra resources at the source and in the IP network and is wasteful of network bandwidth.

Some useful background references describing IP multicasting in greater detail include: (1) Kosiur, D., "IP Multicasting: The Complete Guide to Corporate Networks", Wiley, 1998; (2) Maufer, T., "Deploying IP Multicast in the Enterprise", Prentice-Hall, 1997; (3) Deering, S., "Host Extensions for IP Multicasting," Network Working Group Request for Comments Internet RFC-1112, August 1989;. (4) Waitzman, D., Partridge, C., Deering, S., "Distance Vector Multicasting Routing Protocol," Network Working Group Request for Comments Internet RFC-1075, November 1988; (5) Schulzrinne, H., Casner, S., Frederick, R., Jacobson, V., "RTP: A Transport Protocol for Real-Time Applications," Network Working Group Request for Comments Internet RFC 1889, Jul. 18, 1994. The IP multicast protocol set forth in the IETF RFC 1112 "Host Extensions for IP Multicasting" is the standard protocol for enabling hosts to establish and conduct IP multicast sessions on the Internet. The IETF RFC 1075, "Distance Vector Multicast Routing Protocol (DVMRP)," describes a protocol for propagating routing information among multicast-enabled routers.

The multicast backbone on the Internet (Mbone) is an extension of the Internet backbone to support IP multicasting. The Mbone is formed collectively by the portion of the network routers in the Internet backbone that are programmed to perform the IP multicast routing protocol. Those routers in the Internet backbone that are programmed to handle IP multicast sessions, as well as unicast sessions, are referred to herein as multicast-enabled routers. The Mbone is a virtual network that is layered on top of sections of the physical Internet. It is composed of islands of multicast-enabled routers connected to each other by virtual point-to-point links called "tunnels." The tunnels allow multicast traffic to pass through the non-multicast-enabled routers of the Internet. IP multicast packets are encapsulated as IP-over-IP, so that they look like normal unicast packets to the intervening routers. The encapsulation is added upon entry to a tunnel and removed upon exit from a tunnel. This set of multicast-enabled routers, their directly connected subnetworks, and the interconnecting tunnels define the Mbone. For additional details, see (1) Comer, Douglas E. Internetworking with TCP/IP: Volume 1—Principles, Protocols, and Architecture, Third Edition. Englewood Cliffs, N.J.: Prentice Hall, 1995; (2) Finlayson, Ross, "The UDP Multicast Tunneling Protocol", IETF Network Working Group Internet-Draft, published Sep. 9, 1998, http://search.ietf.org/internet-drafts/draft-finlayson-umtp-03.txt; and (3) Eriksson, Hans, "MBone: The Multicast Backbone," Communications of the ACM, August 1994, Vol.37, pp.54–60.

Since the multicast-enabled routers of the Mbone and the non-multicast-enabled routers of the Internet backbone have different topologies, multicast-enabled routers execute a separate routing protocol to decide how to forward multicast packets. The majority of the Mbone routers use the Distance Vector Multicast Routing Protocol (DVMRP), although some portions of the Mbone execute either Multicast OSPF (MOSPF) or the Protocol-Independent Multicast (PIM) routing protocols. For more details about PIM, see: Deering, S., Estrin, D., Farrinaci, D., Jacobson, V., Liu, C., Wei, L., "Protocol Independent Multicasting (PIM): Protocol Specification", IETF Network Working Group Internet Draft, January, 1995.

Multicasting on the Internet has a unique loss environment. On a particular path the losses occur in bursts, as multicast-enabled routers become congested, rather than the losses having the characteristics associated with white noise. When packets are lost on a particular link in the multicast tree, any downstream receivers lose the same packet.

However, congestion in different parts of network is not correlated since traffic to receivers in other parts of the multicast tree does not necessarily pass through the same congested nodes and therefore does not lose the same bursts of packets. Therefore, path diversity would be a good means for recovering at least some of the missing packets, if there were a way to coordinate such a recovery.

Another problem in IP multicasting is that some Internet Service Providers (ISPs) discriminate against multicast packets and discard them before discarding the packets for other services. Therefore, it would be worthwhile balancing the efficiency of multicast transmissions with the quality of point-to-point transmissions.

These problems have been solved by the Network-Based Service for the Repair of IP Multicast Sessions described in the above referenced, copending U.S. patent application by Maxemchuk, et al. In the Maxemchuk, et al. system, a repair server polls multiple transmit servers to accumulate as many of the packets missing from the multicast session as possible. This improves the quality of audio and video multicasts of live conferences, news broadcasts and similar material from one source to many receivers over the Internet.

The invention disclosed herein is an improvement to the Maxemchuk, et al. system, to provide an automatic invocation of self-monitoring and ranking among several retransmit servers in response to the multicast source's request to have its multicast session repaired, which is transparent to the end user recipients of the multicast session. The invention disclosed herein also provides for the source's request to be authorized by a subscription server that causes the source to be billed for the repair service.

SUMMARY OF THE INVENTION

The invention is a system and method for the automatic and transparent repair of IP multicast sessions. In one aspect of the invention the method repairs a multicast session in a network, beginning with the step of sending a request message from a source to a subscription server in the network, requesting a repair service for an original multicast session originated by the source. The method continues by sending an enabling signal from the subscription server to a plurality of retransmit servers in the network, to buffer data traffic from the original multicast session, in response to the request. The method continues by buffering a copy of the data traffic at each of the plurality of retransmit servers and monitoring errors in each copy. The method continues by automatically selecting with the plurality of retransmit servers at least one retransmit server from among the plurality, having a minimum of the errors in its respective copy. The method concludes by sending the respective copy as a multicast repair service to a repair server in the network to enable the repair server to provide a repaired multicast session derived from the respective copy.

In another aspect of the invention, the method repairs a multicast session in a network, beginning with the step of sending a request message from a source to a subscription server in the network, requesting a repair service for an original multicast session originated by the source. The method continues by sending an enabling signal from the subscription server to at least one retransmit server and a repair server in the network, to buffer data traffic from the original multicast session, in response to the request. The method continues by buffering a copy of the data traffic at the retransmit server. The method continues by buffering the data traffic in the repair server and monitoring received errors therein. The method continues with the repair server automatically sending a request for the copy in response to the monitoring. The method concludes by sending the copy to the repair server to enable the repair server to automatically provide a repaired multicast session derived from the copy. The subscription server can then cause a billing system to send a bill to the source for the multicast repair service.

The resultant IP multicast sessions are automatically repaired in a manner that is transparent to the end user recipients.

DESCRIPTION OF THE FIGURES

FIG. 2 is a flow diagram of the retransmit server logic program.

FIG. 2A illustrates the packets currently being output by the multicast source.

FIG. 2E illustrates the RTCP sender report packet periodically output by the multicast source.

FIG. 3 is a more detailed functional block diagram of a retransmit server 110A.

Discussion of the Preferred Embodiment

Figure 1:
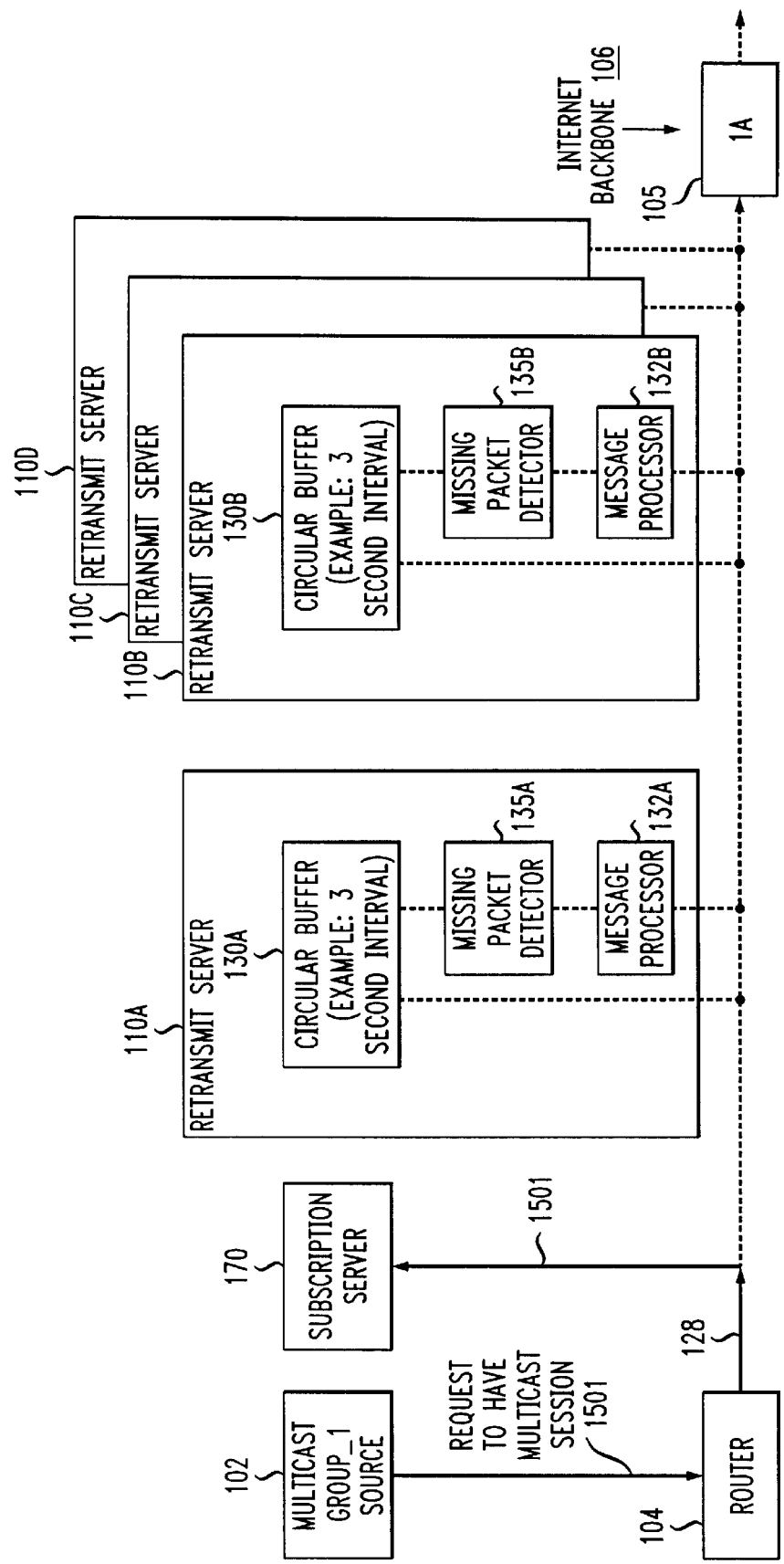
FIG. 1 shows a multicast source sending a request to have a repair service provided for its multicast session.
Figure 1A:
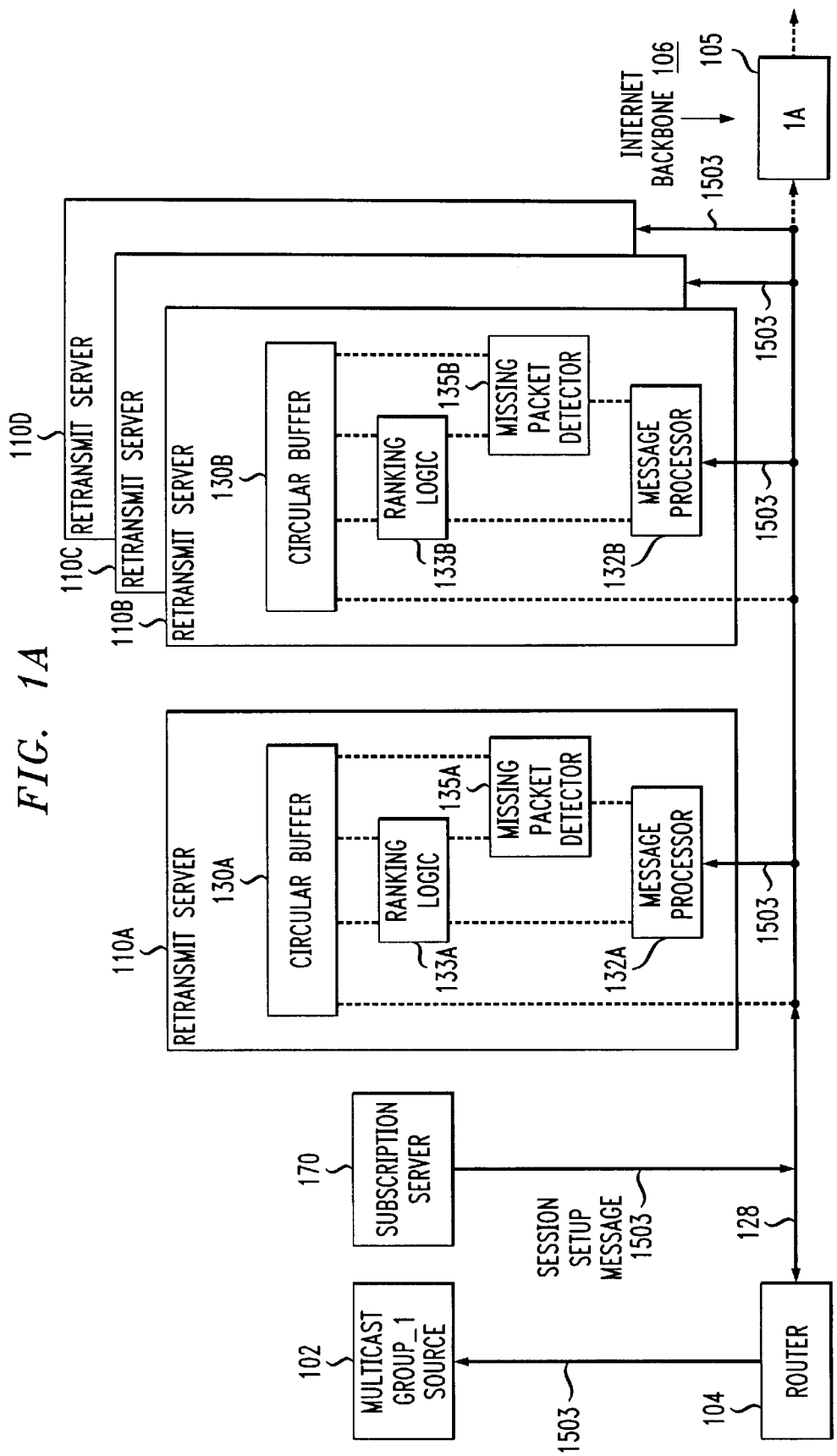
FIG. 1A shows a subscription server replying to the multicast source with a session setup message that is also sent to a plurality of retransmit servers in the network.

The source 102 in FIG. 1, can arrange for the automatic repair of a planned multicast session by sending a request 1501 to the subscription server 170, in anticipation that losses may occur during that session due to network congestion. The source 102 will make arrangements with the subscription server 1501 to pay for the repair service for the multicast session. The subscription server 1501 then enables a repair service such as is described in the above referenced Maxemchuk, et al. patent application. The repair service will be carried out by a system of repair servers and retransmit servers which accumulate as many of the packets missing from the multicast session as possible. FIG. 1A shows the subscription server 170 replying to the multicast source 102 with a session setup message 1503 that is also sent to a plurality of retransmit servers 110A, 110B, 110C, and 110D in the network. In accordance with the invention, the repair service automatically invokes a process of self-monitoring and ranking among several retransmit servers, which enables the repair service to be transparent to the end user recipients of the multicast session. The subscription server will later cause the source to be billed for the repair service through an appropriate billing system.

Figure 1B:
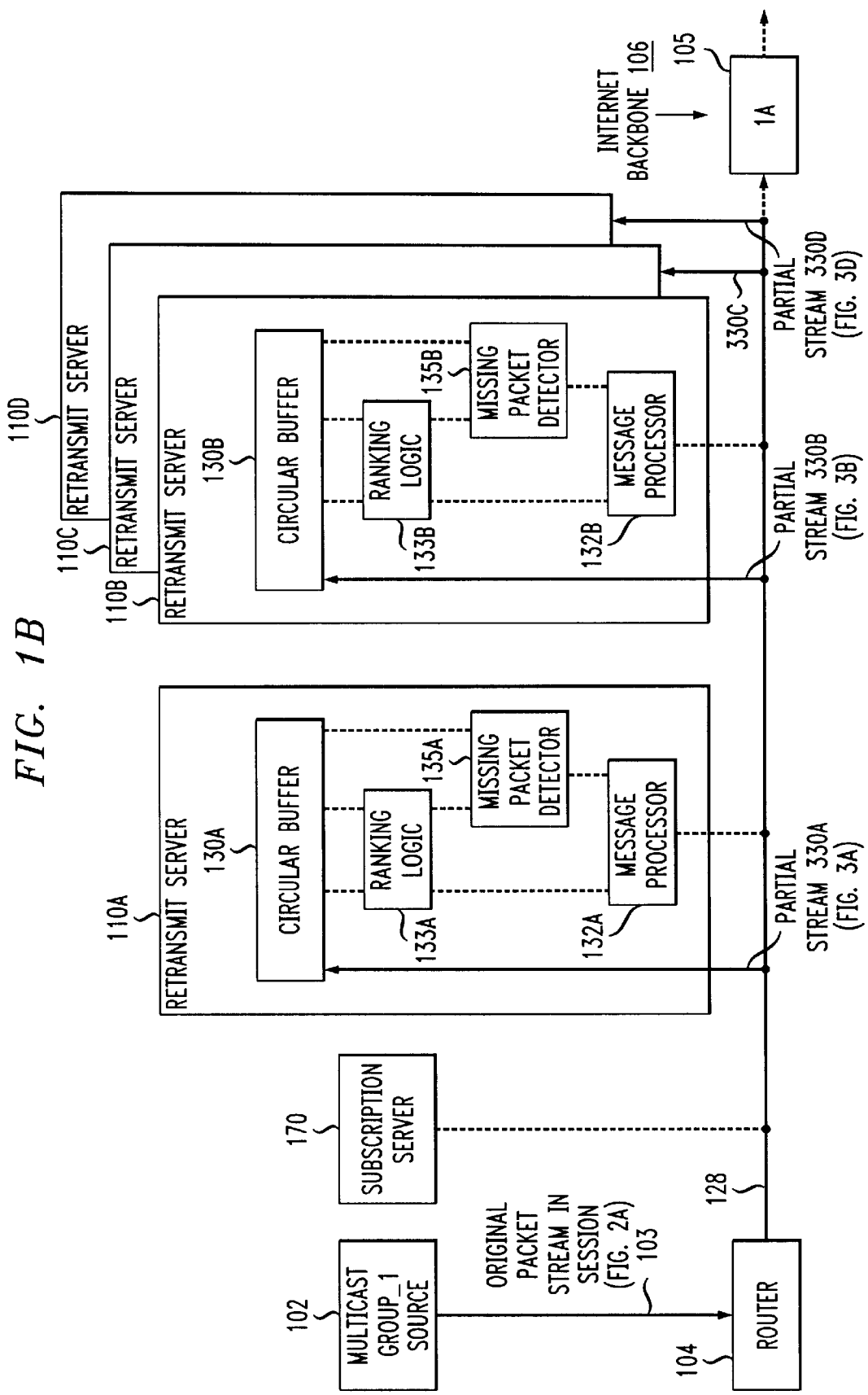
FIG. 1B shows the multicast source multicasting its original packet stream in the session. The figure also shows that the retransmit servers may receive only portions of the original packet stream during the session.

FIG. 1B shows the multicast source 102 multicasting its original packet stream 103 in the session. FIG. 2A illustrates the packets currently being output by the multicast source. FIG. 1B also shows that the retransmit servers 110A, 110B, 110C, and 110D may receive only portions of the original packet stream 103 during the session.

FIGS. 3A, 2B, 3C, and 3D show the packets from the session received by the retransmit servers 110A, 110B, 110C, and 110D, respectively.

Figure 1C:
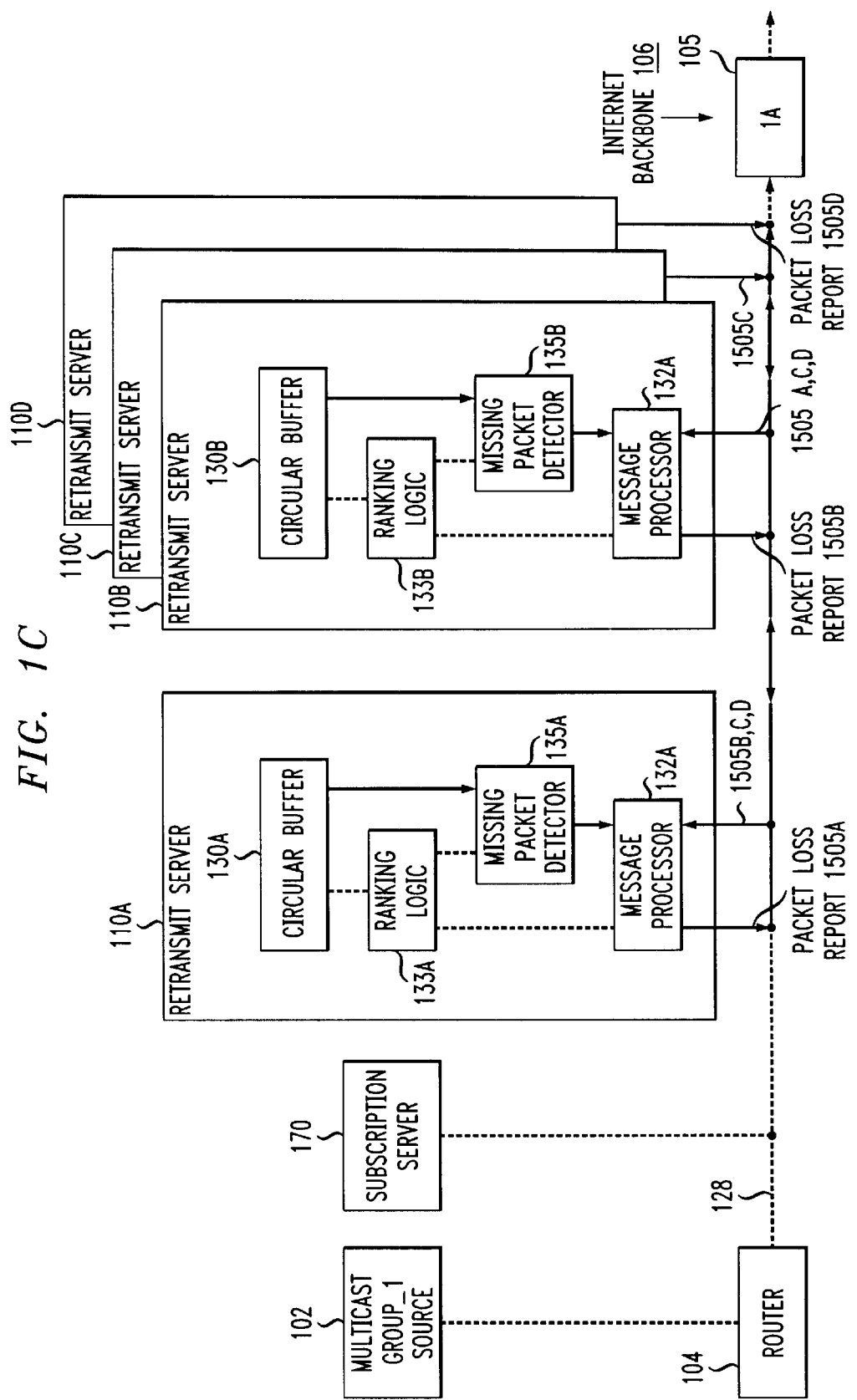
FIG. 1C shows the retransmit servers transmitting a packet loss report to each other for the session.
Figure 1D:
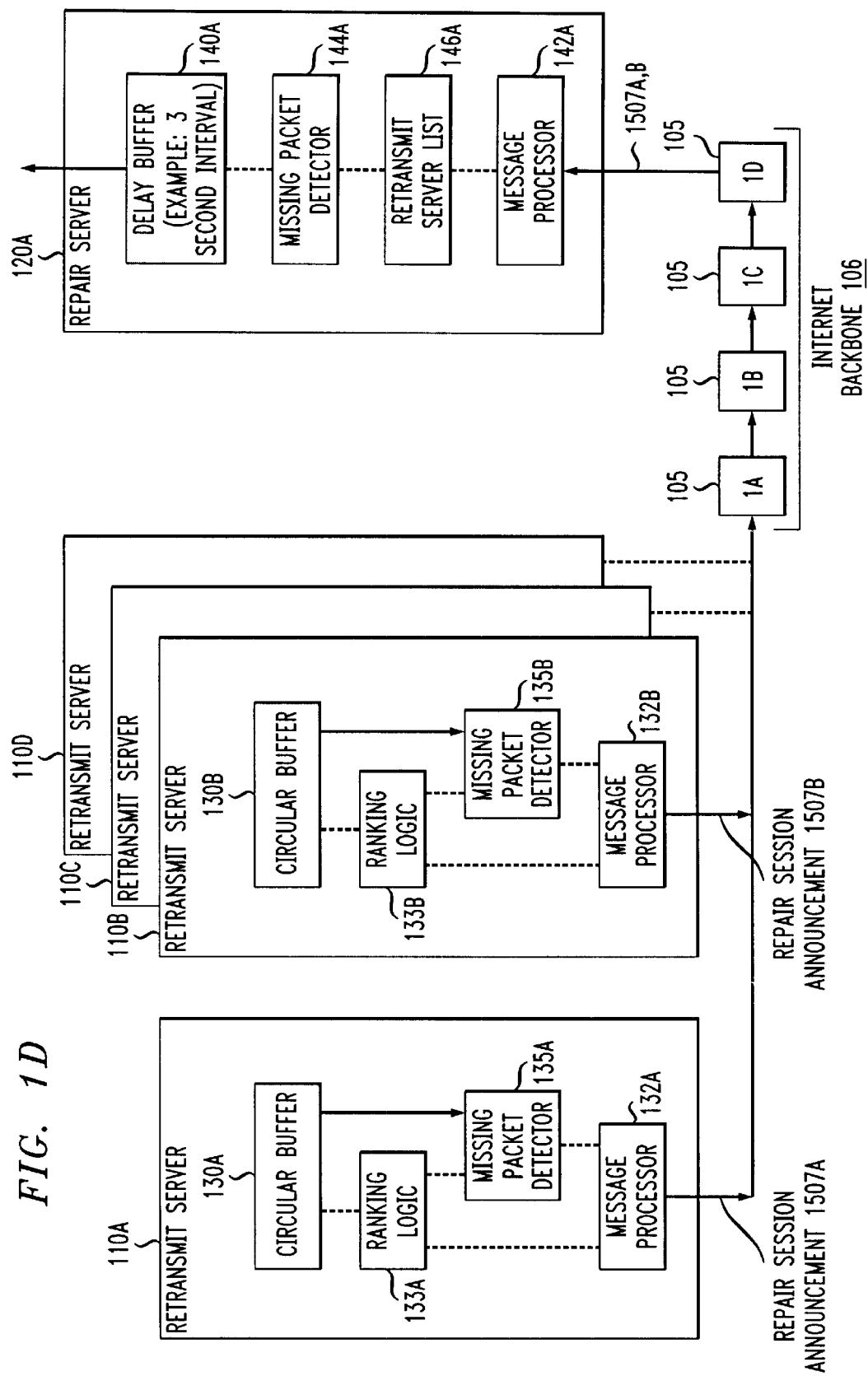
FIG. 1D shows the retransmit servers transmitting a repair session announcement to the network, about their ability to repair the source's multicast session.
Figure 1E:
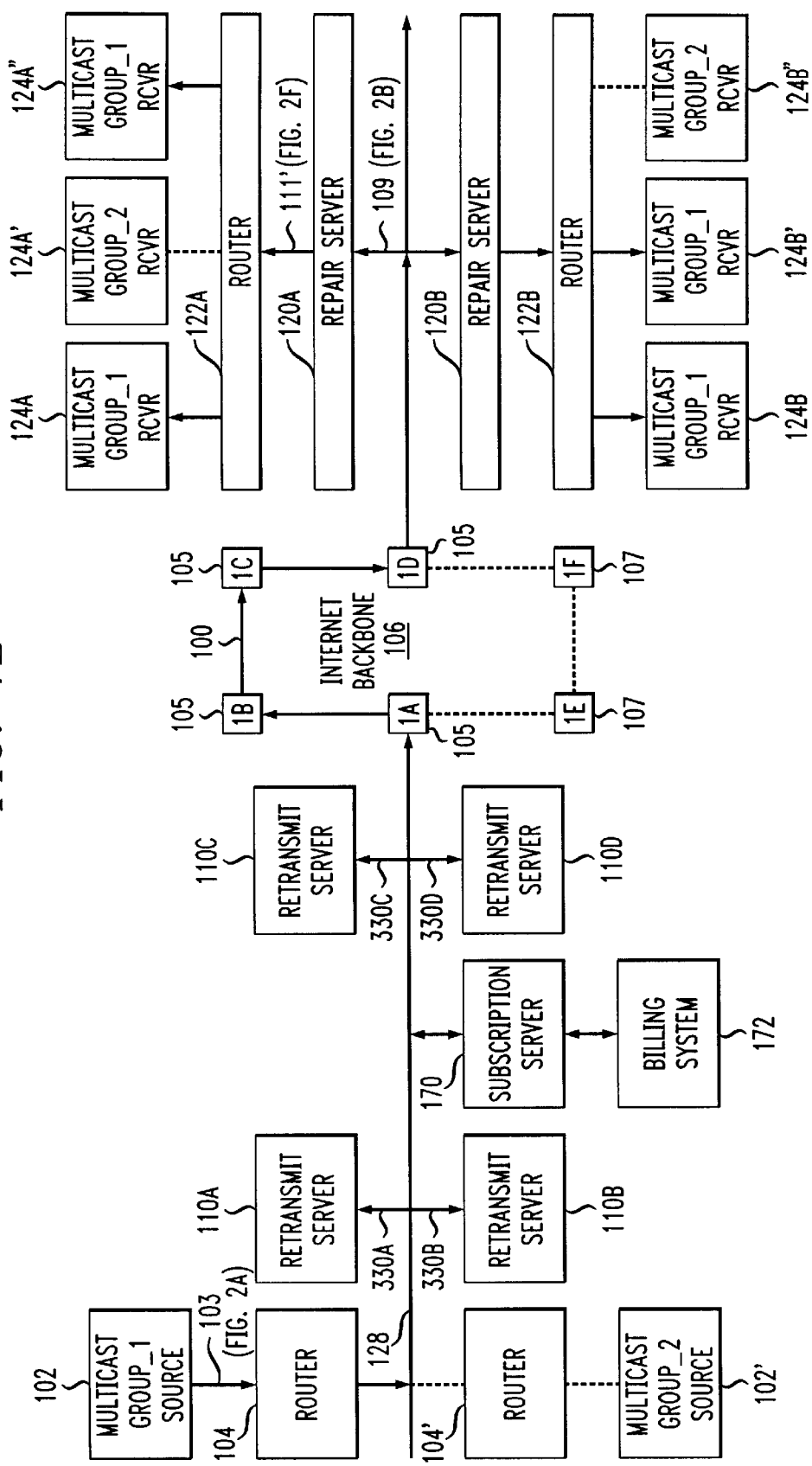
FIG. 1E is an overall network diagram showing the relationship of multicast sources, a plurality of retransmit servers, repair servers, and receivers in the Internet network.

FIG. 1E is an overall network diagram showing a multicast source 102 that is transmitting a Group_1 multicast session 100, whose packets 103 are shown in FIG. 2A. FIG. 2A illustrates the packets 103 currently being output by the multicast source 102, with packets 281 to 290 being shown. The packets pass through the multicast enabled IP router 104 and are output on line 128 to the Internet backbone 106 (IP network). A second multicast source 102' is shown transmitting a second Group_2 multicast session onto the Internet backbone 106.

Figure 3A:
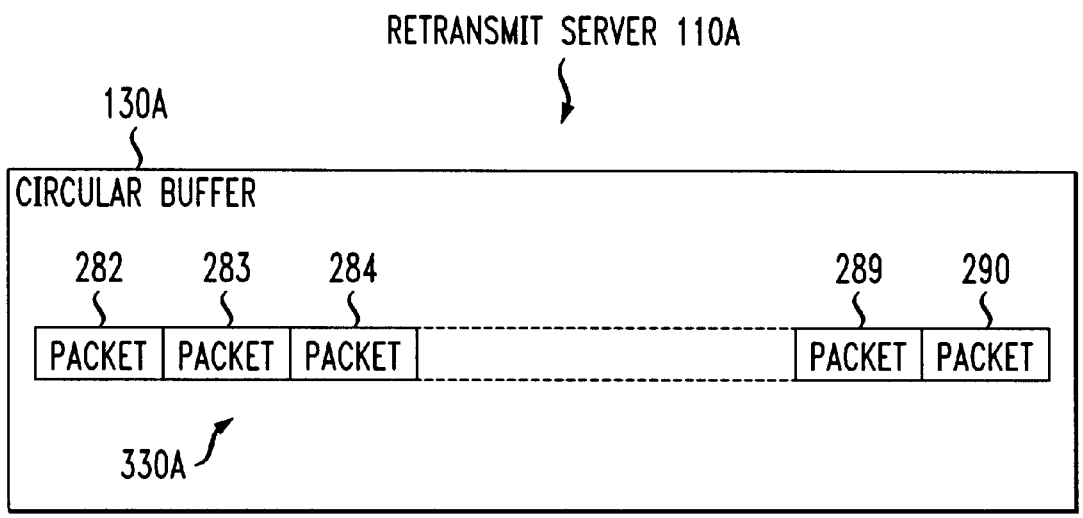
FIG. 3A shows the packets from the session received by the first retransmit server.

The plurality of retransmit servers 110A, 110B, 110C, and 110D shown in FIG. 1E, are connected to the Internet backbone 106. Each retransmit server, for example 110A in FIG. 1, includes a circular buffer 130A that stores a running segment of the multicast Group_1 session received from the source 102, for example the most recent three second interval of the received session. The session packet stream 103 sent from the source 102 may undergo some packet losses by the time it reaches the retransmit server 110A. FIG. 3A shows the packets 330A from the Group_1 session received by the first retransmit server 110A, namely packets 282–284 and 289–290. Note that four packets 285–288 are missing. Each retransmit server, for example 110A in FIG. 1, includes a buffered packet detector 134A that can identify the packets that have been received from the Group_1 session. It can also take advantage of the Real-Time Control Protocol (RTCP), discussed below, to estimate the number of packets that have been missed from the session. Each retransmit server, for example 110A in FIG. 1, includes a message processor 132A that handles message formation and transmission and which handles message receipt and interpretation for message exchanges with other nodes on the network. FIG. 3 is a more detailed functional block diagram of a retransmit server 110A.

Figure 3B:
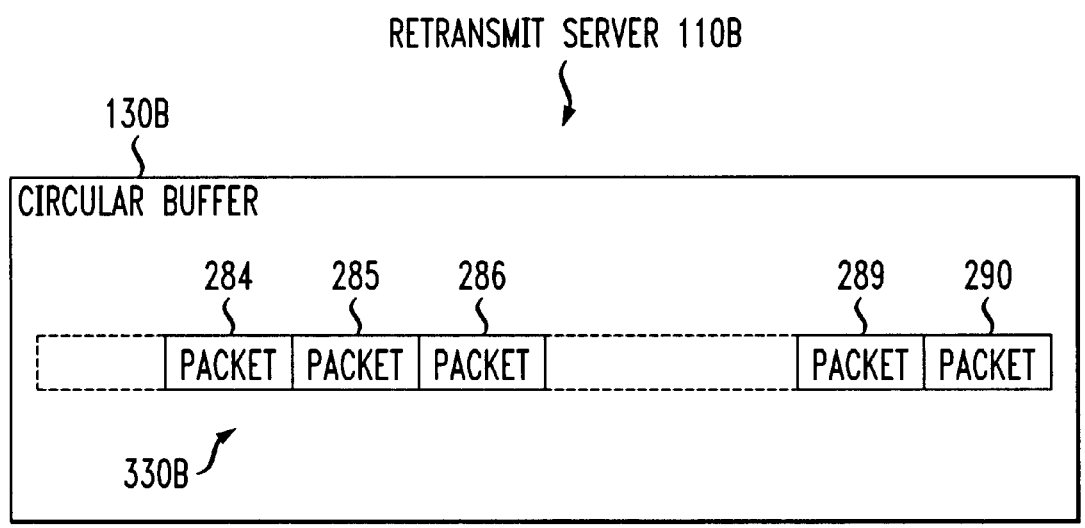
FIG. 3B shows the packets from the session received by the second retransmit server.
Figure 3C:
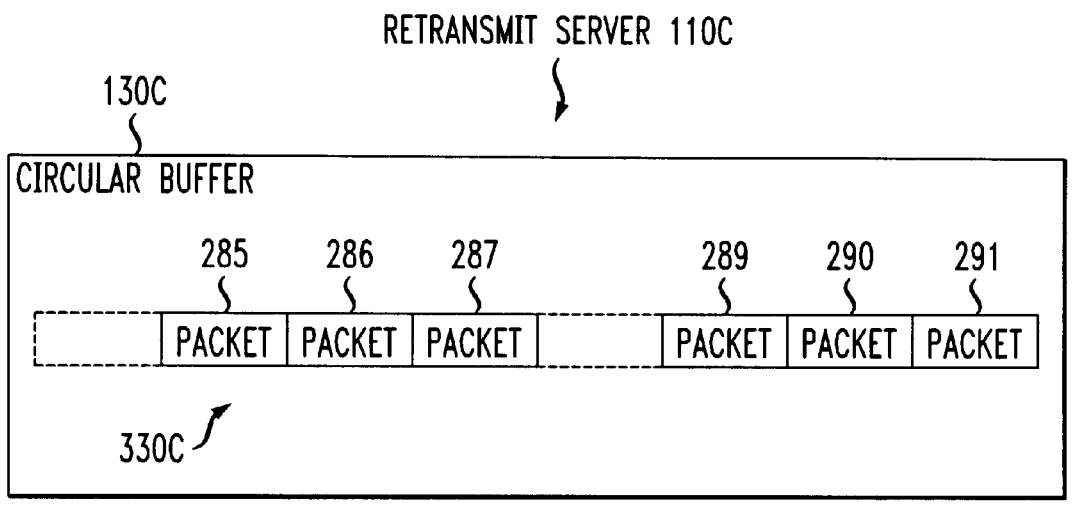
FIG. 3C shows the packets from the session received by the third retransmit server.
Figure 3D:
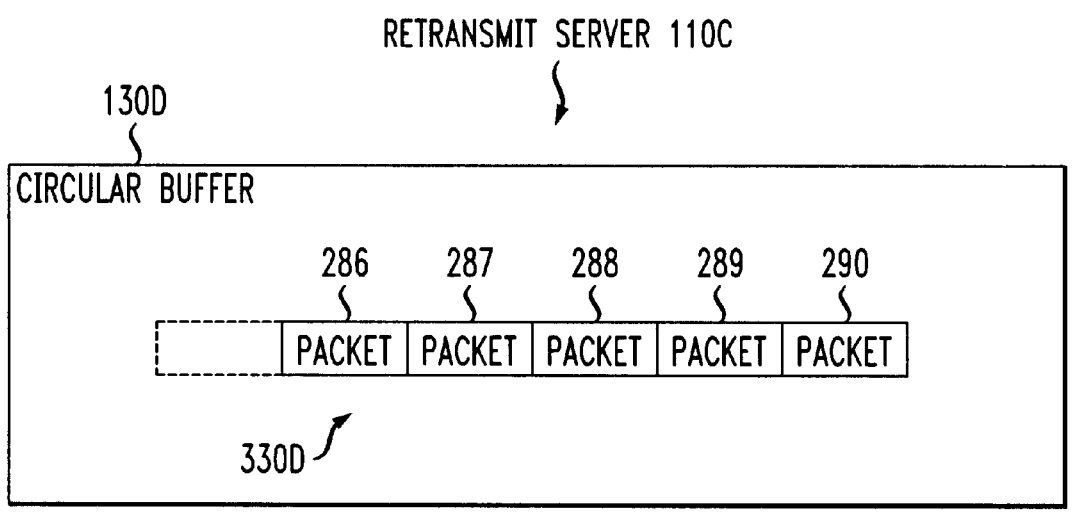
FIG. 3D shows the packets from the session received by the fourth retransmit server.

FIG. 3B shows the packets 330B from the Group_1 session received by the second retransmit server 110B, namely packets 284–286 and 289–290. Note that a total of five packets are missing, including packets 283, 287 and 288 which are missing. FIG. 3C shows the packets 330C from the Group_1 session received by the third retransmit server 110C, namely packets 285–287 and 289–291. Note that a total of six packets are missing, including packets 283, 284, and 288 which are missing. FIG. 3D shows the packets 330D from the Group_1 session received by the fourth retransmit server 110D, namely packets 286–290. Note that a total of seven packets are missing, including packets 283–285 which are missing.

The multicast source 102 uses the Real-Time Transport Protocol (RTP) to multicast the packets 103. The Real-Time Transport Protocol (RTP) is carried over User Datagram Protocol (UDP) packets over IP networks from the source 102 to the repair server 120A, and from the source 102 to the retransmit servers 110A, 110B, 110C, and 110D. RTP provides timestamps and sequence numbers. Both the retransmit servers 110A, 110B, 110C, and 110D and the repair servers 120A and 120B can use this information to identify when some of the packets 103 are lost or arrive out of sequence. RTP also supports payload type identification, synchronization, encryption and multiplexing and demultiplexing on a per-user basis. For more detailed information on RTP, see (1) Schulzrinne, H., Casner, S., Frederick, R., Jacobson, V.,. "RTP: A Transport Protocol for Real-Time Applications", Network Working Group Request for Comments Internet RFC 1889, January 1996; (2) Kosiur, D. "IP Multicasting: The Complete Guide to Corporate Networks", Wiley, 1998.

Figure 2B:
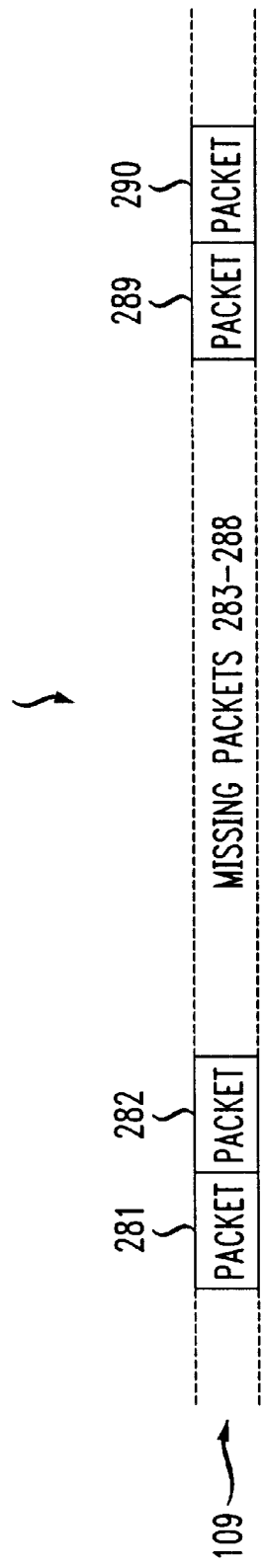
FIG. 2B illustrates the packets currently being delivered to the repair server.
Figure 2C:
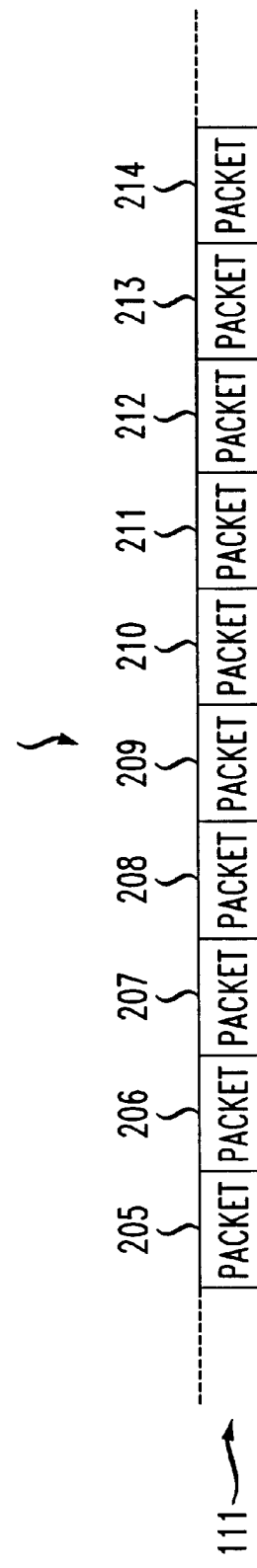
FIG. 2C illustrates the packets currently being delivered to the recipients by the repair server.
Figure 2D:
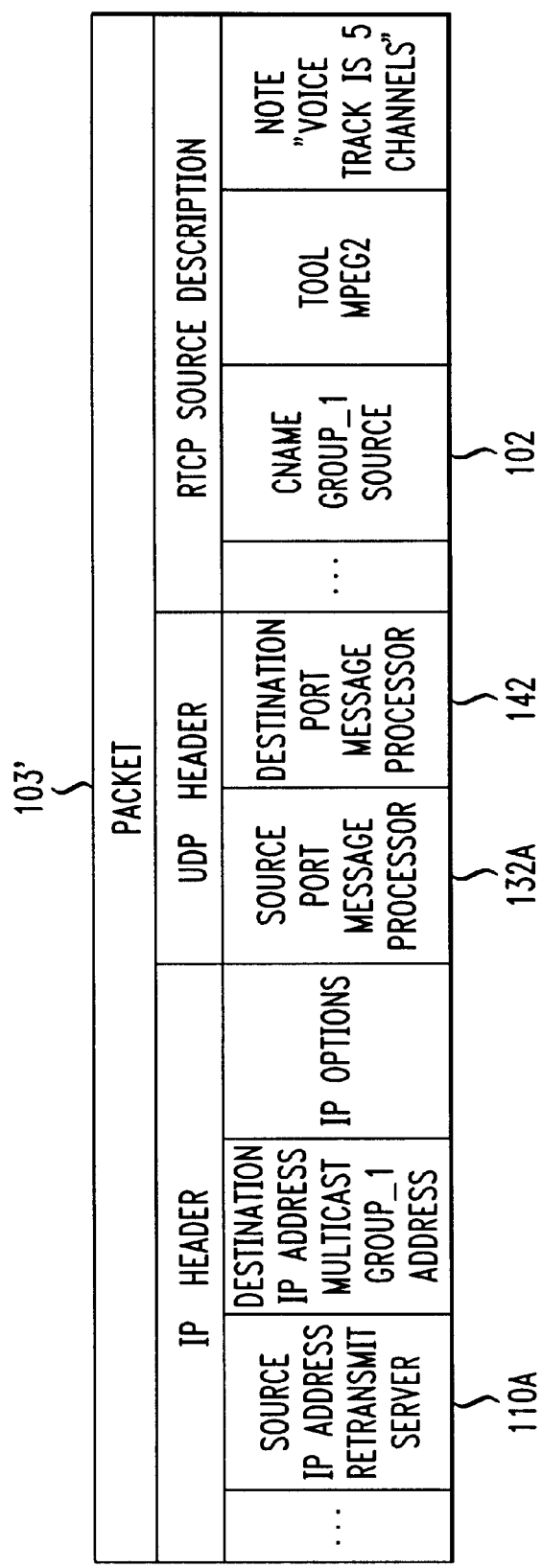
FIG. 2D illustrates the RTCP source description packet periodically output by the multicast source.

FIG. 2D illustrates the RTCP source description packet 103' periodically output by the multicast source 102. FIG. 2E illustrates the RTCP sender report packet 103" periodically output by the multicast source 102. The Real-Time Control Protocol (RTCP) is the control protocol that is used in conjunction with RTP. Senders 102 can report the number of packets and bytes that are sent. Receivers can report on the loss, delay, and observed jitter (per sender). Other functions include media synchronization, network time protocol (NTP) and RTP timestamp correlation, and session control. For more details on RTCP, see (1) Kosiur, D., "IP Multicasting: The Complete Guide to Corporate Networks", Wiley, 1998; and (2) Thomas, S., "Ipng and the TCP/IP Protocols: Implementing the Next Generation Internet", Wiley, 1996.

The RTCP source description packet 103" of FIG. 2D periodically describes in the TOOL field the media tool or application in the source 102 that is generating the packets 103, such as an MPEG2 video and audio compression program. The RTCP source description packet 103" can also describe in the NOTE field the current state of the source, such as the current number of audio channels included in the MPEG2 transmission.

The RTCP sender report packet 103" in FIG. 2E periodically reports the sender's packet count for the source 102. This is the total number of RTP data packets transmitted by the source 102 since starting transmission up until the time this packet 103" was generated. The RTCP sender report packet 103" in FIG. 2E also periodically reports the sender's octet count for the source 102. This is the total number of payload octets (i.e., not including header or padding) transmitted in RTP data packets by the source 102 since starting transmission up until the time this packet 103" was generated. This field can be used to estimate the average payload data rate.

Figure 3E:
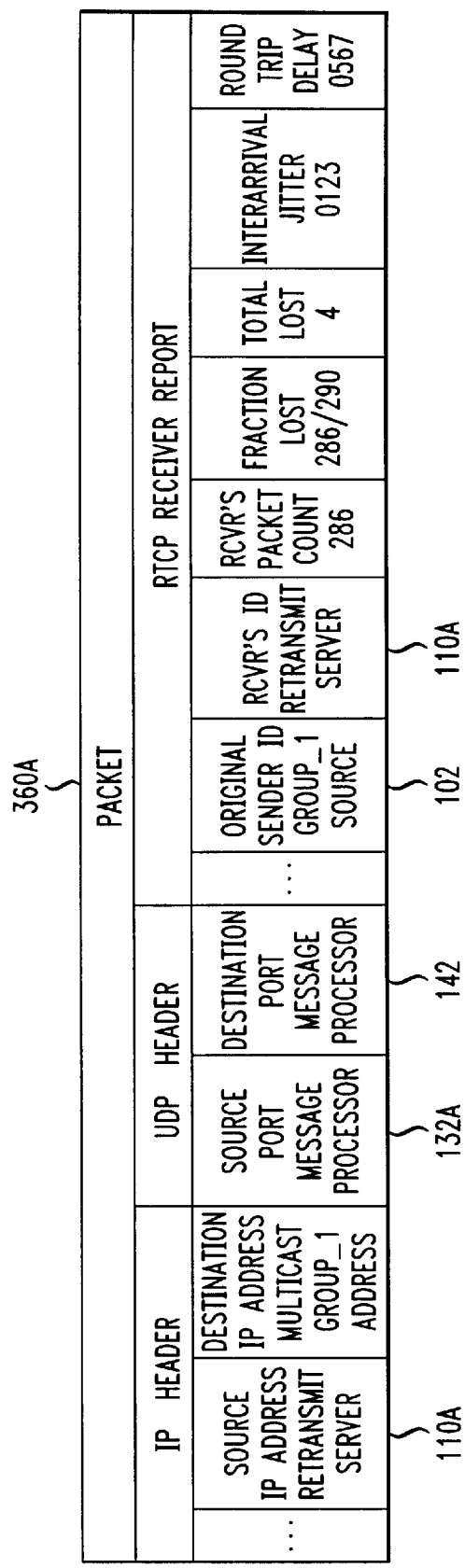
FIG. 3E shows the RTCP report packet that is periodically output by the first retransmit server, reporting on the condition of the multicast Group_1 session packets received at the retransmit server.
Figure 3F:
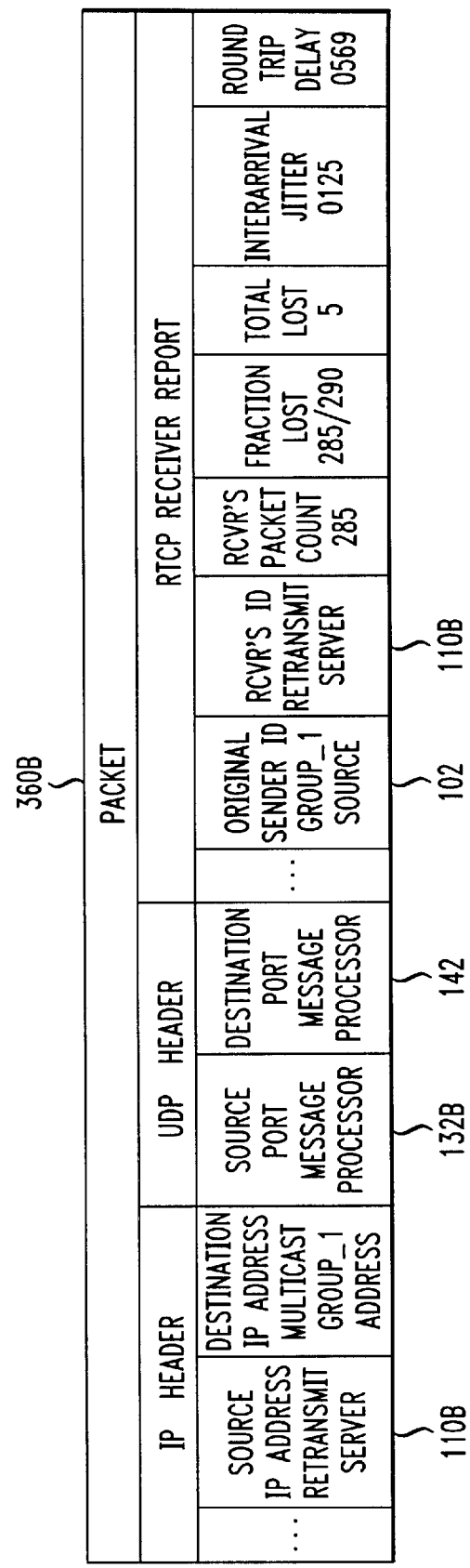
FIG. 3F shows the RTCP report packet that is periodically output by the second retransmit server, reporting on the condition of the multicast Group_1 session packets received at the retransmit server.
Figure 3G:
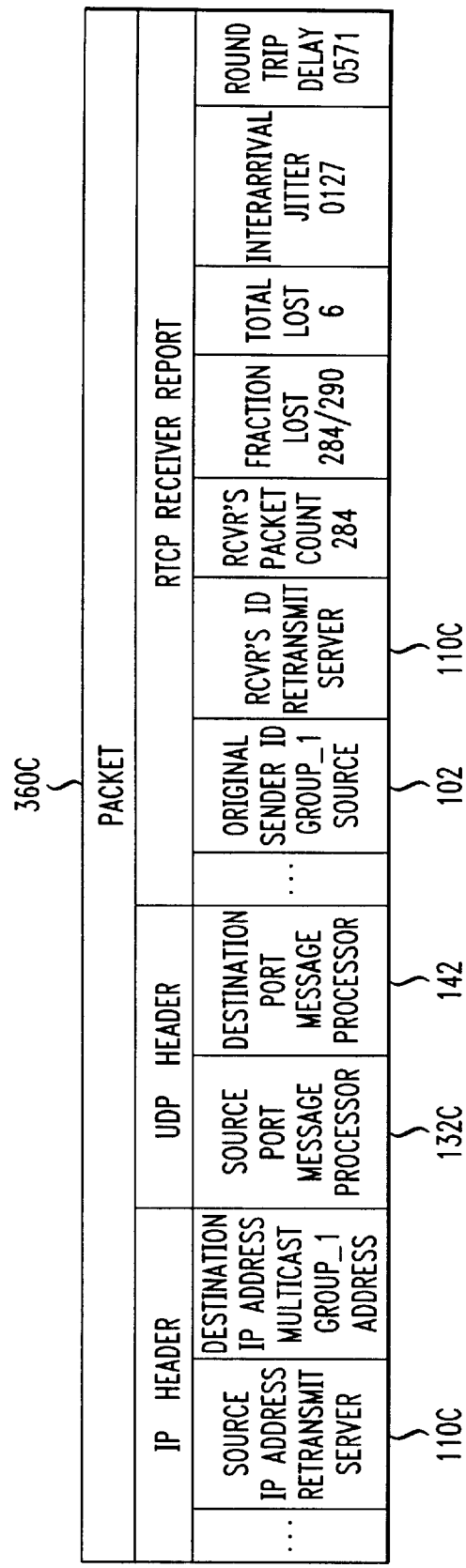
FIG. 3G shows the RTCP report packet that is periodically output by the third retransmit server, reporting on the condition of the multicast Group_1 session packets received at the retransmit server.
Figure 3H:
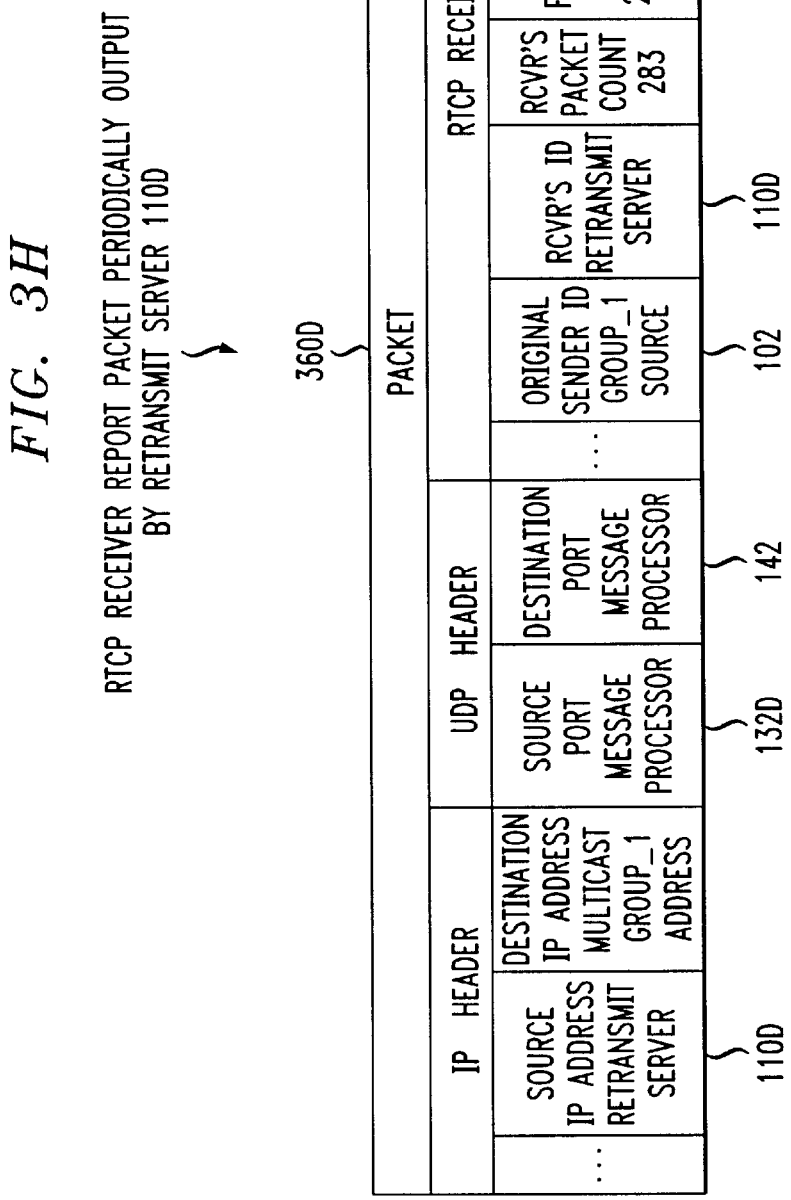
FIG. 3H shows the RTCP report packet that is periodically output by the fourth retransmit server, reporting on the condition of the multicast Group_1 session packets received at the retransmit server.

The retransmit servers periodically transmit RTCP receiver reports on the quality of the multicast Group_1 session as received from the source 102. FIG. 1C shows the retransmit servers transmitting a packet loss report to each other for the session. FIG. 3E shows the RTCP receiver report packet 360A that is periodically output by the retransmit server 110A, reporting on the condition of the multicast Group_1 session packets 330A received at the retransmit server. FIG. 3F shows the RTCP receiver report packet 360B that is periodically output by the retransmit server 110B, reporting on the condition of the multicast Group_1 session packets 330B received at the retransmit server. FIG. 3G shows the RTCP receiver report packet 360C that is periodically output by the retransmit server 110C, reporting on the condition of the multicast Group_1 session packets 330C received at the retransmit server. FIG. 3H shows the RTCP receiver report packet 360D that is periodically output by the retransmit server 110D, reporting on the condition of the multicast Group_1 session packets 330D received at the retransmit server.

The format of the receiver report (RR) packet is substantially the same as that of the sender report (SR) packet except for minor differences, and except that the packet type field indicates that it is a receiver report. The remaining fields have the same meaning as for the SR packet. The RTCP receiver report includes the SSRC_n (source identifier) field that identifies the source 102 to which the information in this reception report pertains. The RTCP receiver report includes the fraction lost field which provides the fraction of RTP data packets from source SSRC_n lost since the previous SR or RR packet was sent. This fraction is defined to be the number of packets lost divided by the number of packets expected, as defined below. The RTCP receiver report includes the cumulative number of packets lost field, which provides the total number of RTP data packets from source SSRC_n that have been lost since the beginning of reception. This number is defined to be the number of packets expected less the number of packets actually received, where the number of packets received includes any which are late or duplicates. Thus packets that arrive late are not counted as lost, and the loss may be negative if there are duplicates. The number of packets expected is defined to be the extended last sequence number received, as defined next, less the initial sequence number received. The RTCP receiver report includes the extended highest sequence number received field, which provides the highest sequence number received in an RTP data packet from source SSRC_n. The RTCP receiver report includes the interarrival jitter field which provides an estimate of the statistical variance of the RTP data packet interarrival time, measured in timestamp units and expressed as an unsigned integer. The interarrival jitter J is defined to be the mean deviation (smoothed absolute value) of the difference D in packet spacing at the receiver compared to the sender for a pair of packets. This is equivalent to the difference in the "relative transit time" for the two packets; the relative transit time is the difference between a packet's RTP timestamp and the receiver's clock at the time of arrival, measured in the same units. The interarrival jitter is calculated continuously as each data packet "i" is received from source SSRC_n, using this difference D for that packet and the previous packet i−1 in order of arrival (not necessarily in sequence). Whenever a reception report is issued, the current value of J is sampled. The RTCP receiver report includes the last SR timestamp (LSR) field that provides the NTP timestamp received as part of the most recent RTCP sender report (SR) packet from source SSRC_n. The RTCP receiver report includes the delay since last SR (DLSR) field, which provides the delay, between receiving the last SR packet from source SSRC_n and sending this reception report. Let SSRC_r denote the receiver issuing this receiver report. Source SSRC_n can compute the round-trip propagation delay to SSRC_r by recording the time A when this reception report is received. It calculates the total round-trip time A-LSR using the last SR timestamp (LSR) field, and then subtracting this field to leave the round-trip propagation delay as (A−LSR−DLSR). This information can be transferred from the source 102 to the retransmit server 110A in the RTCP sender report or the RTCP source description. This field in the RTCP receiver report from the retransmit server 110A may be used as an approximate measure of distance between the source 102 and the retransmit server 110A, although some links have very asymmetric delays. For more details on RTCP, see Schulzrinne, H., Casner, S., Frederick, R., Jacobson, V., "RTP: A Transport Protocol for Real-Time Applications", Network Working Group Request for Comments Internet RFC 1889, Jul. 18, 1994.

In FIG. 1E, the Internet backbone is shown including a first path that includes multicast-enabled routers 105, respectively labeled 1A, 1B, 1C, and 1D, forming the Mbone portion that can handle IP multicast sessions, such as Group_1 session 100. The Internet backbone is also shown including a second path that includes non-multicast-enabled routers 107, respectively labeled 1E and 1F, which cannot can handle IP multicast sessions. Because heavy multicast traffic levels occur that can only be handled by the multicast-enabled routers 105, these routers tend to see high levels of congestion more often that do the non-multicast-enabled routers 107.

Repair servers 120A and 120B are shown in FIG. 1E connected to the Internet backbone 106. FIG. 2B illustrates the packets 109 currently being delivered to the repair server 120A, namely packets 281, 282, 289, and 290. Note that packets 283–288 are missing from the received session. A plurality of receivers 124A, 124A', and 124A" are shown connected through the multicast-enabled router 122A to the repair server 120A. Receivers 124A and 124A" are receiving the Group_1 session. FIG. 2C illustrates the packets 111 currently being delivered to the recipients at receivers 124A and 124A" by the repair server 120A, namely packets 205–214 which are being buffered for a three second delay in the repair server 120A, before being multicast to receivers 124A and 124A". Receiver 124A' is receiving the second multicast Group_2 session from repair server 120A.

FIG. 1E also shows a second plurality of receivers 124B, 124B', and 124B" are shown connected through the multicast-enabled router 122B to the repair server 120B. Receivers 124B and 124B' are receiving the Group_1 session and receiver 124B" is receiving the Group_2 session. FIG. 1E also shows a subscription server 170 connected between the Internet backbone 106 and the billing system 172.

Each repair server, for example 120A in FIG. 1D, includes a delay buffer 140A that stores a running segment of the multicast Group_1 session received from the source 102, for example the most recent three second interval of the received session. This three second delay is applied to the arriving packets 109 before they are forwarded in multicast mode to the receivers 124A and 124A". The session packet stream 103 sent from the source 102 may undergo some packet losses by the time it reaches the repair server 120A. FIG. 2B shows the packets 109 from the Group_1 session received by the repair server 120A, namely packets 281, 282, 289, and 290. Note that packets 283–288 are missing. Each repair server, for example 120A in FIG. 1D, includes a missing packet detector 144A that can identify the packets that have been lost from the Group_1 session. The retransmit server list 146A is compiled by a server list updating program. The list 146A is an ordered list of the retransmit servers 110A–110D. This list 146A is processed to enable the repair server 120A to identify which of the several retransmit servers 110A–110D is the most likely one to have the best copy of the Group_1 session packets, in the event that they are needed for repair. The above-referenced Maxemchuk et al. patent application provides a more detailed description of the repair server 120A.

In accordance with the invention, each of the retransmit servers, for example 110A in FIG. 1A, includes a ranking logic 133A which is programmed with a ranking program that receives and processes the Real-Time Control Protocol (RTCP), discussed below, to estimate the number of packets that each retransmit server 110A–110D has missed from the multicast Group_1 session 103. The ranking program can apply a number of performance criteria to rank the respective retransmit servers 110A–110D.

The ranking criteria that the ranking program in the ranking logic 133A of the retransmit server 110A can apply to rank the respective retransmit servers 110A–110D can be based on the RTCP receiver reports multicast by each of the retransmit servers 110A–110D. For example, FIG. 3E shows the RTCP receiver report packet 360A that is periodically output by the retransmit server 110A, reporting on the condition of the multicast Group_1 session packets 330A received at the retransmit server. The RTCP receiver report includes the fraction lost field which provides the fraction of RTP data packets from source SSRC_n lost by a retransmit server 110A, for example, since the previous SR or RR packet was sent. The RTCP receiver report includes the cumulative number of packets lost field, which provides the total number of RTP data packets from source SSRC_n that have been lost by a retransmit server 110A, for example, since the beginning of reception. The RTCP receiver report includes the interarrival jitter field which provides an estimate of the statistical variance of the RTP data packet interarrival time experienced by a retransmit server 110A, for example, measured in timestamp units and expressed as an unsigned integer. The round propagation delay between the source and a retransmit server 110A, for example, which may be used as an approximate measure of distance between the source 102 and the retransmit server 110A.

Assume for this example that the ranking logic 133A in the retransmit server 110A places the retransmit servers in the order from highest to lowest as 110A, 110B, 110C, 110D, based on the total packets lost, as reported by the RTCP receive report which is multicast by each respective retransmit server 110A–110D. Since retransmit server 110A has reported that it has the fewest total packets lost (4 packets), it is ranked as the most probable to have buffered copies of the missing packets. Since retransmit server 110B has reported that it has the second fewest total packets lost (5 packets), it is ranked as the second most probable to have buffered copies of the missing packets. Since retransmit server 110C has reported that it has the third fewest total packets lost (6 packets), it is ranked as the third most probable to have buffered copies of the missing packets. Since retransmit server 110D has reported that it has the fourth fewest total packets lost (7 packets), it is ranked as the fourth most probable to have buffered copies of the missing packets.

Further in accordance with the invention, each respective retransmit server 110A, 110B, 110C, and 110D compiles a ranking list in the ranking logic 133 which lists the retransmit servers in the order from highest to lowest as 1110A, 110B, 110C, 110D, based on the RTCP receive reports which are multicast by each respective retransmit server 110A–110D to all others. The ranking list will be the same in each retransmit server. Each respective retransmit server compares its own rank in the list to the ranks of the others and determines if its rank lies below a pre-established threshold value. If a respective retransmit server 110A, 110B, 110C, or 110D determines that its rank lies below a pre-established threshold value, then it withdraws from further participation in providing a repair service for the multicast Group_1 session 103 from the source 102. In this example. Since retransmit servers 110B, 110C, 110D are ranked beneath retransmit server 110A in the list in their respective ranking logic 133, retransmit servers 110B, 110C, 110D withdraw from further participation in providing a repair service for the multicast session from the source 102. This leaves retransmit server 110A as the remaining active retransmit server to continue further participation in providing a repair service for the multicast Group_1 session 103 from the source 102.

In response, retransmit server 110A, as the remaining active retransmit server to continue further participation in providing a repair service for the multicast Group_1 session 103, will periodically transmit Session Description Protocol (SDP) announcements to inform potential recipients 124A about the existence of a multicast session providing a repaired version of the multicast Group_1 session 103. FIG. 1D shows the retransmit servers transmitting a repair session announcement to the network, about their ability to repair the source's multicast session. In order to join an IP multicast session, software at the receiver 124A, for example, must know the IP address and port of that session. One way this can be done is for the retransmit server 110A to periodically announce this information on a well-known IP multicast session. The Session Description Protocol (SDP) used serves two primary purposes: (a) to communicate the existence of a session and (b) to convey sufficient information so end users may join the session. Some of the information included in an SDP datagram is: the name and purpose of the session, time(s) the session is active, the media comprising the session, the transport protocol, the format, and the multicast address and port. Software developers may add other attributes to SDP announcements for specific applications For more detailed information on SDP, see Handley, M. and Jacobson, V., "SDP: Session Description Protocol", Network Working Group Request for Comments Internet RFC 2327, November 1997.

In accordance with the invention, repaired packets are transmitted from the retransmit server 110A in either a unicast session or a multicast session providing a repaired version of the multicast Group_1 session 103. Then, the repair server 120A forwards the repaired session as a multicast session 111' to the receivers 124A and 124A". The repaired multicast session 111' is constructed by the repair server 120A by combining the packets 109 of FIG. 2B received in the delay buffer 140A with the missing packets received from the retransmit server 110A.

Figure 2F:
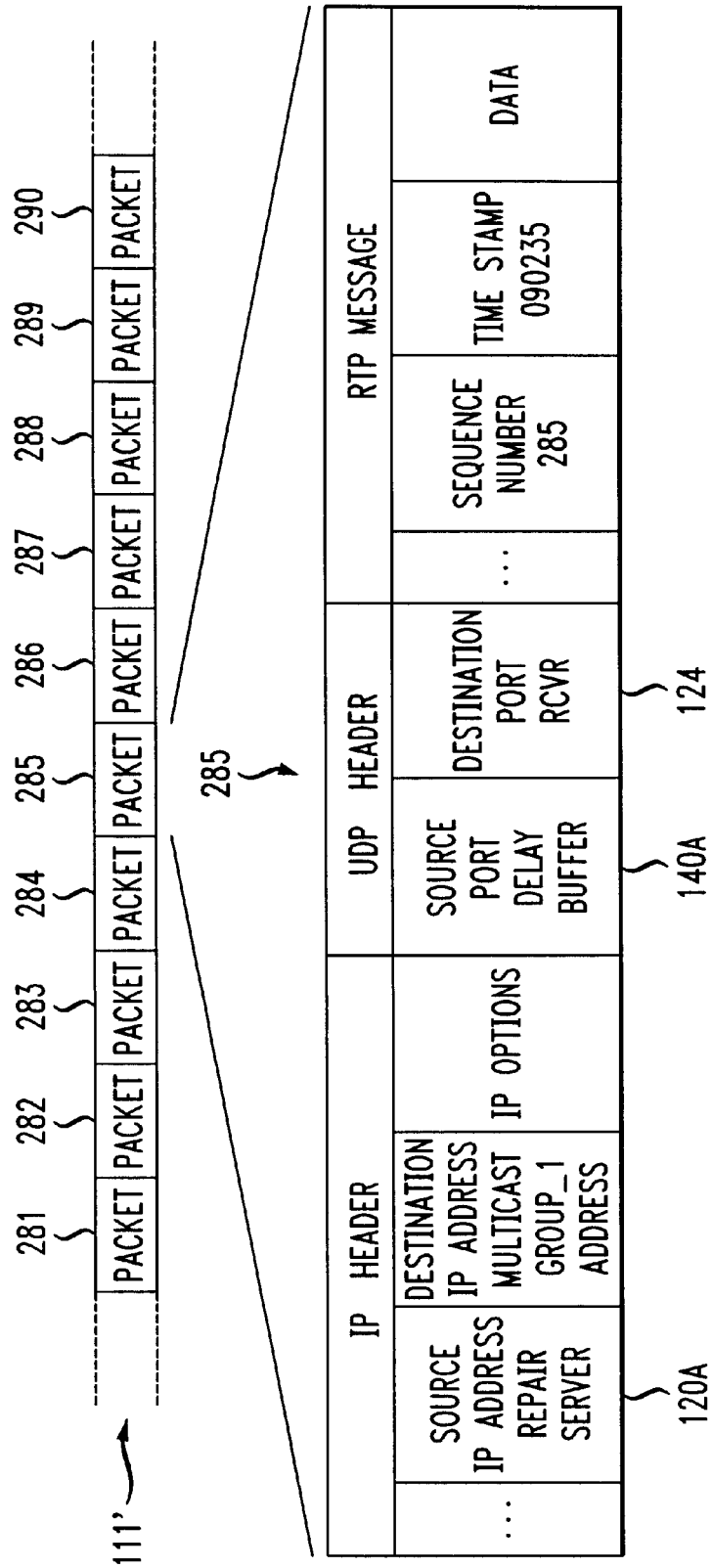
FIG. 2F illustrates the packets in the repaired multicast session 111' constructed by the repair server, which appear to the recipient receivers to be the same Group_1 session transmitted from source, having the same multicast IP address and port number as that for the original packet stream of FIG. 2A.

The repaired multicast session 111' is constructed by the repair server 120A from the repair service multicast session received from retransmit server 110A, providing a repaired version of the multicast Group_1 session 103. FIG. 2F illustrates the packets 111' that are sequentially ordered in the delay buffer in time to be transmitted in a multicast session to the recipient receivers 124A and 124A". For example, missing packets 283 and 284 from the first retransmit server 110A are placed in order following packet 282 in the delay buffer 140A. The delay buffer 140A can be organized for indirect addressing of packets that are buffered at various locations in the buffer 140A. The pointers are sequentially addressed to provide the desired order for the output stream of packets 111'. Each pointer respectively points to a location in the delay buffer 140A where a packet having a sequence number is stored. A first pointer in the output sequence points to packet 282. The next pointer in the output sequence is made to point to the recovered packet 283. The next pointer thereafter in the output sequence is made to point to the recovered packet 284. In this manner, when missing packets are recovered from the retransmit servers, they can be stored at any available location in the delay buffer 140A and the pointer for that packet sequence number is made to point to the storage location of the recovered packet.

The packets in the multicast session 111' of FIG. 2F constructed by the repair server 120A resume using the RTP format. The multicast session 111' can appear to the recipient receivers 124A and 124A" to be the same Group_1 session transmitted from source 102, as is shown in FIG. 2F, having the same multicast IP address and port number as that for the original packet stream 103 of FIG. 2A.

Since corrections provided by the invention are implemented by network based repair servers 120A and 120B and retransmit servers 110A–110D, the quality of a multicast transmission is improved without changing or adding to the software in either the multicast source 102 or the recipient receivers 124A, 124A', 124A", 124B, 124B', or 124B". This is a major improvement between the invention and prior proposed techniques. If the source 102 is communicating using Real-Time Transport Protocol (RTP), real video, real audio, or some other multicasting protocol before the repair is performed, the source continues to use the same protocols after the repair. Aside from the improved quality of the received signal at the recipient receiver 124A, the source 102 and recipient receivers 124A, etc. do not see any change.

Figure 1F:
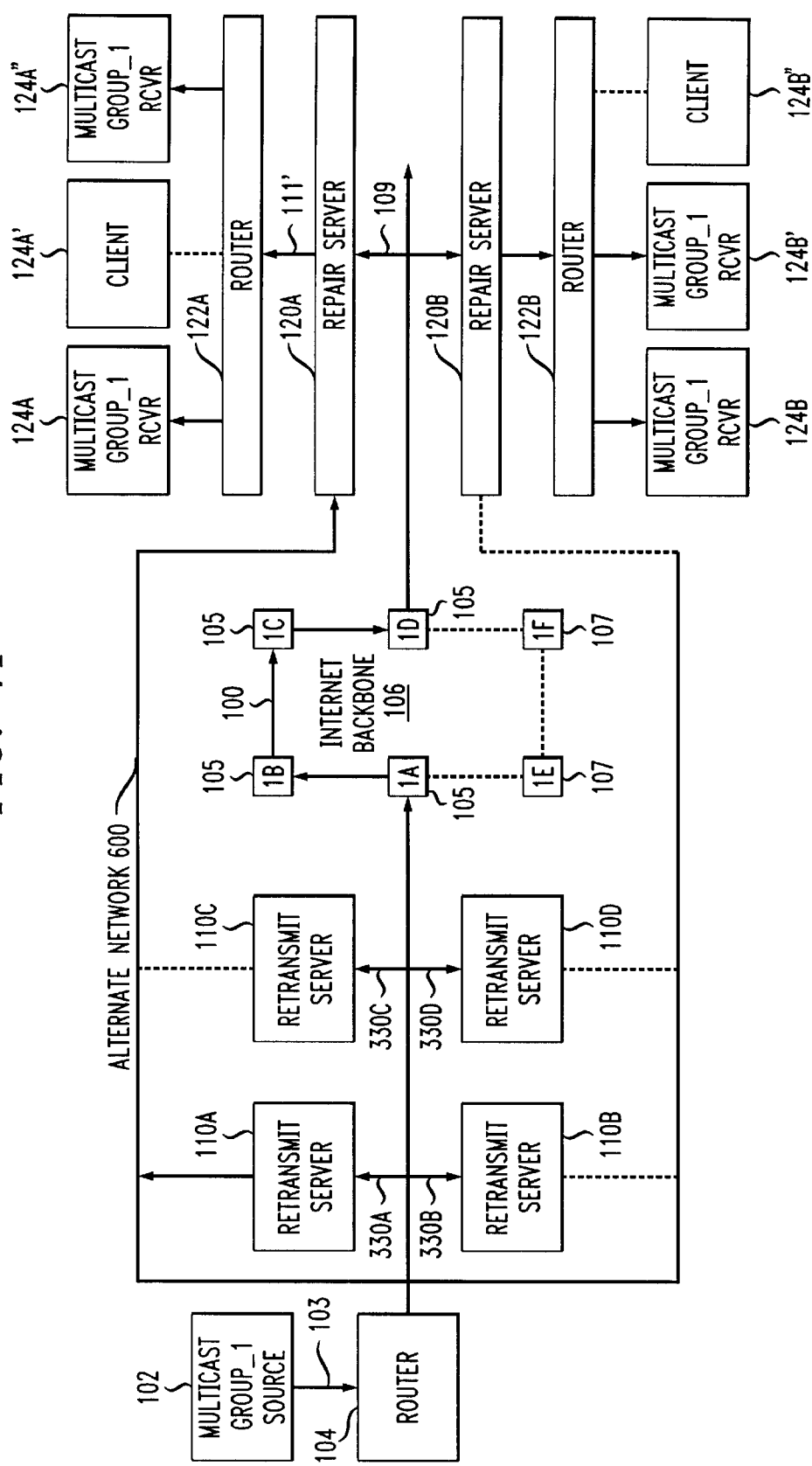
FIG. 1F is an alternate embodiment of the network of FIG. 1E, showing an alternate, bypass network used for the responses from the retransmit servers to the repair server, of the portions of missing packets.

FIG. 1F is an alternate embodiment of the network of FIG. 1E, showing an alternate, bypass network 600 used for the responses from the retransmit servers 110A, etc. to the repair server 120A, of the portions of missing packets. In accordance with the invention, in response to the requests, a message processor 130A in at least one of the retransmit servers 110A, retransmits in a bypass session to the repair server 120A, at least a portion the missing packets. The retransmitted packets in the bypass session are forwarded to circumvent at least some of the congested, multicast enabled routers 105 in the Internet backbone 106. This can be accomplished by transmitting the missing packets over a separate dial-up network 600 or a private virtual network 600 from the retransmit servers 110A, etc. to the repair server 120A. Another way this can be accomplished is by transmitting the missing packets in a unicast session from the retransmit servers 110A, etc. to the repair server 120A. The unicast response enables non-multicast enabled routers 107 in the Internet backbone to handle the response, thereby circumventing at least some of the congested multicast-enabled routers 105.

FIG. 3 is a functional block diagram of a retransmit server. Memory 302 is connected by bus 304 to the CPU processor 306 that executes the instructions in programs stored in memory 302. Bus 304 also connects to hard drive storage 308, network interface card 310 which connects to the Internet backbone 106, and network interface card 312 which connects to the alternate, bypass network 600 of FIG. 1F. Memory 302 has stored in it the circular buffer 130A, buffered packet detector program 134A, message processor program 132A, subscription server message processor 352, multicast session quality monitoring program 354, other retransmit server monitoring program 356, internet group management protocol 332, user datagram protocol 334, internet control message protocol 336, transmission control protocol 338, retransmit server logic program 340 which implements the ranking logic 133A, operating system 342, IP protocol stack 345, multicast routing daemon 355, real-time control protocol 346, session description protocol 348, and real-time transport protocol 350.

The primary function of the retransmit servers 110A–110D is to supply any missing packets in an IP multicast session such as Group_1, to the repair servers 120A and 120B. The retransmit servers 110A–110D must buffer packets in a session received from the source 102. Each retransmit server 110A–110D must periodically transmit its IP address and port and the IP address and port of each multicast session for which it has buffered packets, to enable receivers 124A, etc. to know the availability of repair services for a particular multicast session. A multicast group with address, port number combination A, P can be reserved for the retransmit servers to communicate with the repair servers.

The mapping from IP multicast to Ethernet multicast is straight forward. The low order 23 bits of the IP multicast address is placed in the low-order 23 bits of the Ethernet multicast address 01.00.5E.00.00.00 (hex). The mapping from IP to Ethernet multicast allows for delivery of IP multicast datagrams over Ethernet LAN segments to various hosts and routers participating in the multicast sessions.

FIG. 2 is a flow diagram of the retransmit server logic program.

The flow diagram 1000 of FIG. 2 has the following steps:

Step 1001: Begin originator-initiated automatic repair of IP multicast sessions.

Step 1002: IP multicast source 102 registers with subscription server 170 to indicate that it wants a session repaired.

Step 1004: Subscription server 170 sends this request to the retransmit servers 110A, 110B, 110C, 110D.

Step 1006: Each retransmit server listens to that multicast session and evaluates its quality. It periodically reports the quality to other retransmit servers in the session via RTCP messages.

Step 1008: A retransmit server receives periodic RTCP messages. These allow it to compare its packet loss for a specific IP multicast session to that experienced by other retransmit servers.

Step 1010: If a retransmit server has more than "L %" packet loss or is not one of the "N" retransmit servers with highest quality, then it stops listening to that session.

Step 1012: Each retransmit server periodically transmits: (A) its IP address and port number and (B) the IP address and port number of each multicast session for which it has buffered packets.

Step 1014: The repair servers 120A, 120B monitor these transmissions by retransmit servers to determine which retransmit servers can help repair a specific IP multicast data stream.

Step 1016: If a repair server determines that packets are missing in an IP multicast data stream, it communicates with one or more retransmit servers that can supply the missing packets.

Step 1018: The subscription server sends charges to the billing system.

Various illustrative examples of the invention have been described in detail. In addition, however, many modifications and changes can be made to these examples without departing from the nature and spirit of the invention.

What is claimed is:

1. In a method for repairing a multicast session in a network, the steps comprising:

sending a request message from a source to a subscription server in the network, requesting a repair service for an original multicast session originated by said source;

sending an enabling signal from said subscription server to a plurality of retransmit servers in the network, to buffer data traffic from said original multicast session, in response to said request;

buffering a copy of said data traffic at each of said plurality of retransmit servers and monitoring errors in each copy;

automatically selecting with said plurality of retransmit servers at least one retransmit server from among said plurality, having a minimum of said errors in its respective copy; and sending said respective copy to repair servers in the network to enable said repair server to automatically provide a transparent repaired multicast session derived from said respective copy.

2. The method of claim 1, wherein said plurality of retransmit servers periodically transmit messages to inform the repair servers about repaired multicast sessions that are available.

3. In a method for repairing a multicast session in a network, the steps comprising:

sending a request message from a source to a subscription server in the network, requesting a repair service for an original multicast session originated by said source;

sending an enabling signal from said subscription server to at least one retransmit server and a repair server in the network, to buffer data traffic from said original multicast session, in response to said request;

buffering a copy of said data traffic at said retransmit server;

buffering said data traffic in said repair server and monitoring received errors therein;

said repair server automatically sending a request for said copy in response to said monitoring, and sending said copy to the repair server to enable said repair server to automatically provide a transparently repaired multicast session derived from said copy.

4. A network, including a source of multicast packets in a multicast session and a plurality of multicast recipients in that session, comprising:

a subscriber server in the network, maintaining subscription information about said source;

said subscriber server receiving a request from said source to establish a multicast session to transmit multicast packets in the network and forming a setup message;

a plurality of retransmission servers in the network receiving said setup message from said subscriber server and in response, buffering portions of the packets during the multicast session;

a repair server in the network providing received ones of the packets to said recipients during the multicast session, the repair server including a missing packet detector;

said repair server automatically detecting missing packets and sequentially requesting missing packets from respective ones of the plurality of retransmission servers;

a billing system coupled to the subscriber server, receiving charging information from the subscriber server about said multicast session.

5. In a method for repairing a multicast session in a network, the steps comprising:

registering a request from an IP multicast source with a subscription server to indicate that the source wants a multicast session repaired;

sending the request to a plurality of retransmit servers;

listening at each retransmit server to the multicast session and evaluating its quality;

periodically reporting the quality received by each of the retransmit servers, to other retransmit servers;

comparing at each retransmit server the quality received for a specific IP multicast session to the quality received by other retransmit servers;

determining if a retransmit server has more than "L%" packet loss or is not one of "N" retransmit servers with highest quality, and if so then stopping the retransmit server from listening to the session;

periodically transmitting by a retransmit server, its IP address and port number and an IP address and port number of each multicast session for which it has buffered packets;

monitoring at a repair server transmissions by retransmit servers to determine which retransmit server can help repair a specific IP multicast data stream;

determining at a repair server that packets are missing in an IP multicast data stream, and communicating with at least one retransmit server that can supply the missing packets; and sending charges from the subscription server to a billing system for providing a multicast repair service in response to the source's request.

6. The method of claim 5, wherein a plurality of retransmit servers periodically transmit unicast messages to inform the repair servers about repaired multicast sessions that are available.

7. The method of claim 5, wherein a plurality of retransmit servers periodically transmit multicast messages to inform the repair servers about repaired multicast sessions that are available.

* * * * *

UNITED STATES PATENT AND TRADEMARK OFFICE
CERTIFICATE OF CORRECTION

PATENT NO. : 6,501,763 B1  Page 1 of 1
DATED : December 31, 2002
INVENTOR(S) : Vijay K. Bhagavath et al.

It is certified that error appears in the above-identified patent and that said Letters Patent is hereby corrected as shown below:

<u>Title page,</u>
Item [63], delete Related U.S. Application Data in its entirety.

Signed and Sealed this

Twenty-second Day of July, 2003

JAMES E. ROGAN
*Director of the United States Patent and Trademark Office*